United States Patent
Rupp et al.

(10) Patent No.: US 11,350,619 B2
(45) Date of Patent: Jun. 7, 2022

(54) ELECTRIC OUTRIGGER POSITIONER

(71) Applicant: Rupp Marine, Inc., Port Salerno, FL (US)

(72) Inventors: Scott Rupp, Port Salerno, FL (US); Ronald Karpanty, Port Salerno, FL (US)

(73) Assignee: Rupp Marine, Inc., Port Salerno, FL (US)

( * ) Notice: Subject to any disclaimer, the term of this patent is extended or adjusted under 35 U.S.C. 154(b) by 434 days.

(21) Appl. No.: 16/585,060

(22) Filed: Sep. 27, 2019

(65) Prior Publication Data

US 2020/0100484 A1   Apr. 2, 2020

Related U.S. Application Data

(60) Provisional application No. 62/739,560, filed on Oct. 1, 2018.

(51) Int. Cl.

| | |
|---|---|
| *A01K 91/053* | (2006.01) |
| *A01K 97/10* | (2006.01) |
| *F16H 19/08* | (2006.01) |
| *F16H 1/20* | (2006.01) |
| *F16H 55/22* | (2006.01) |

(52) U.S. Cl.
CPC ........... *A01K 91/053* (2013.01); *A01K 97/10* (2013.01); *F16H 1/203* (2013.01); *F16H 19/08* (2013.01); *F16H 55/22* (2013.01)

(58) Field of Classification Search
CPC ...... A01K 91/053; A01K 97/10; A01K 91/08; A01K 91/18; A01K 97/11; B63B 35/14; F16H 1/203; F16H 19/08; F16H 55/22
See application file for complete search history.

(56) References Cited

U.S. PATENT DOCUMENTS

| | | | | |
|---|---|---|---|---|
| 2,958,491 A * | 11/1960 | Ackley | ........... | A01K 97/10 248/514 |
| 3,212,740 A * | 10/1965 | Greenberg | ........... | A01K 97/10 248/514 |
| 3,382,950 A * | 5/1968 | Sawyer | ........... | H01Q 1/084 185/37 |
| 3,724,791 A * | 4/1973 | Mason | ........... | A01K 91/08 248/514 |
| 4,993,346 A | 2/1991 | Rupp | | |
| 5,445,102 A | 8/1995 | Rupp | | |
| 5,581,930 A * | 12/1996 | Langer | ........... | A01K 79/02 43/17 |

(Continued)

*Primary Examiner* — Timothy D Collins
*Assistant Examiner* — Nicholas Leo Seneczko
(74) *Attorney, Agent, or Firm* — McHale & Slavin, P.A.

(57) ABSTRACT

An outrigger positioner for moving an outrigger pole from a stowage position to a deployed position, and from the deployed position to a stowage position. The outrigger driver positioner has a top assembly including a main arm pivotally attached to a base configured for receipt of an outrigger pole. A worm gear assembly is in the pivot arm is moved by a motor, causing the main arm to elevate from a horizontal position to an elevated position. A second motor is coupled to a worm gear assembly in the base assembly which is coupled to the base of the top assembly. The motor rotates the top assembly from a position parallel to a centerline of the boat to a desired position off the beam of the vessel.

7 Claims, 4 Drawing Sheets

(56) References Cited

U.S. PATENT DOCUMENTS

| | | | | |
|---|---|---|---|---|
| 5,638,670 A * | 6/1997 | Raasch | ................... | D01H 4/08 57/102 |
| 5,690,240 A | 11/1997 | Thiemann, Sr. | | |
| 5,738,035 A | 4/1998 | Rupp, II | | |
| 5,778,817 A | 7/1998 | Rupp | | |
| 5,921,014 A * | 7/1999 | Lee | ................... | A01K 91/08 43/21.2 |
| 6,612,548 B2 | 9/2003 | Landreth et al. | | |
| 6,668,745 B2 * | 12/2003 | Slatter | ................... | A01K 91/08 114/255 |
| 6,766,757 B1 * | 7/2004 | Tilley | ................... | B63B 17/00 114/255 |
| 6,769,377 B2 | 8/2004 | Rupp, II | | |
| 7,007,906 B2 * | 3/2006 | Slatter | ................... | A01K 91/08 114/255 |
| 7,114,283 B2 | 10/2006 | Slatter et al. | | |
| 7,669,361 B2 * | 3/2010 | Baez | ................... | A01K 91/08 43/27.4 |
| 8,186,095 B2 * | 5/2012 | Wilcox | ................... | A01K 91/08 43/27.4 |
| 8,468,736 B2 | 6/2013 | Blondeck et al. | | |
| 9,173,387 B2 | 11/2015 | Rupp | | |
| 9,625,087 B2 * | 4/2017 | Sarnowski | ............. | A01K 91/08 |
| 10,258,026 B2 * | 4/2019 | Thomas | ............. | F16M 11/2014 |
| D862,524 S * | 10/2019 | Onorato | ........................ | D15/4 |
| 11,079,064 B1 * | 8/2021 | Cifers | ................. | F16M 13/022 |
| 2001/0046409 A1 * | 11/2001 | Fischer | ................... | B60R 11/02 403/92 |
| 2003/0089021 A1 * | 5/2003 | Miller | ................... | A01K 97/10 43/21.2 |
| 2004/0035350 A1 * | 2/2004 | Rupp, II | ................. | B63B 35/14 114/364 |
| 2004/0206285 A1 * | 10/2004 | McCaffrey | ............. | A01K 73/04 114/61.16 |
| 2004/0206288 A1 | 10/2004 | Wilcox et al. | | |
| 2005/0056751 A1 * | 3/2005 | Slatter | ................... | A01K 91/08 248/288.11 |
| 2007/0074446 A1 * | 4/2007 | Wilcox | ................... | A01K 91/08 43/21.2 |
| 2007/0220800 A1 * | 9/2007 | Baez | ................... | A01K 91/08 43/27.4 |
| 2009/0211141 A1 * | 8/2009 | Marcus | ................... | A01K 97/10 43/21.2 |
| 2011/0083355 A1 * | 4/2011 | Wilcox | ................... | A01K 91/08 43/27.4 |
| 2011/0083357 A1 | 4/2011 | Blondek et al. | | |
| 2013/0333271 A1 | 12/2013 | Rupp | | |
| 2015/0366180 A1 * | 12/2015 | Chmura | ................... | F16M 11/18 248/514 |
| 2017/0059016 A1 * | 3/2017 | Yeas | ................... | B63H 16/10 |
| 2017/0074454 A1 * | 3/2017 | Sarnowski | ............. | B63B 17/00 |
| 2019/0104714 A1 * | 4/2019 | Serocki | ................. | A01K 97/10 |
| 2019/0335735 A1 * | 11/2019 | Serocki | ................. | F15B 15/065 |
| 2020/0100484 A1 * | 4/2020 | Rupp | ................. | A01K 91/053 |
| 2021/0061418 A1 * | 3/2021 | Sanders | ................. | B63B 34/05 |

* cited by examiner

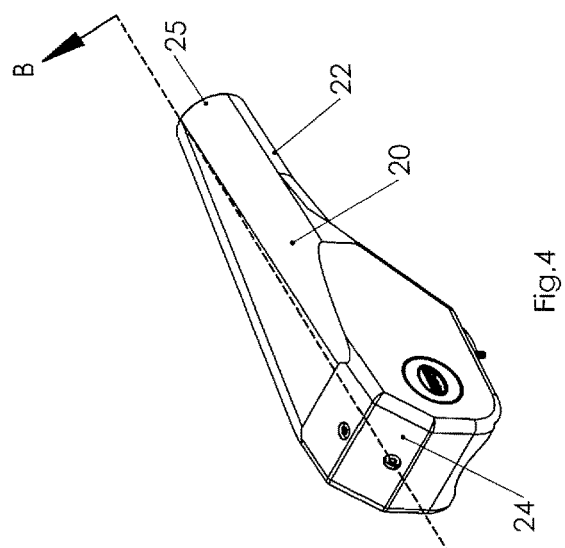
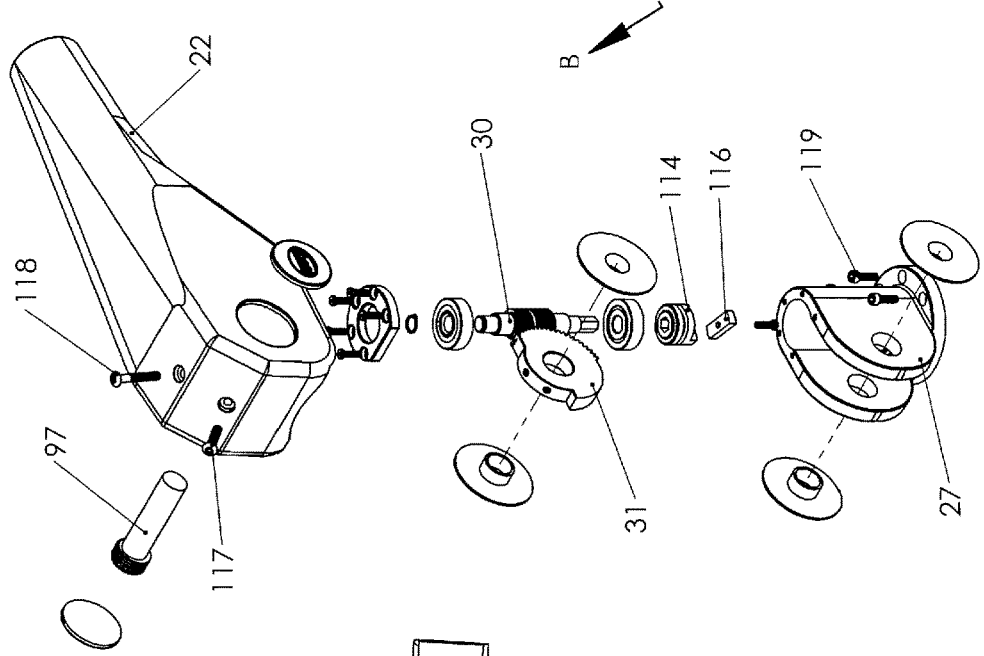
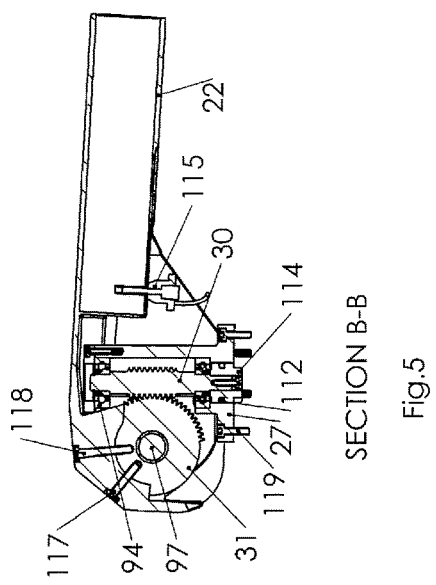
Fig.4
Fig.6
Fig.5 SECTION B-B

SECTION C-C

SECTION D-D

ELECTRIC OUTRIGGER POSITIONER

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/739,560, entitled "ELECTRIC OUTRIGGER POSITIONER", filed Oct. 1, 2018. The contents of which the above referenced application is incorporated herein by reference.

FIELD OF THE INVENTION

This invention relates to the field of fishing, and more particularly, to an electric motor driven outrigger positioner for use on fishing boats.

BACKGROUND OF THE INVENTION

While numerous methods of saltwater fishing exist, the use of a boat has many advantages for both the professional and recreational fisherman. For this reason, many boat manufacturers have built vessels directed solely to the art of fishing. Open fishing boats, so defined due to the open area around a center console, are of particular interest since they are capable of high speeds, are economical to operate, and provide a very safe platform from which to fish.

While outriggers are a common fixture on large sport fishing vessels, the use of the open fishing vessels have become a viable option to many anglers. Notwithstanding the obvious cost savings in vessel purchase, maintenance, and operating cost, the open fishing vessel can be made extremely fast and are highly maneuverable, making them the preferred vessel for fishing tournaments and recreational fishing. Mounting of an outrigger system on an open fishing vessel is unlike that of a conventional sport fishing vessel since a benefit of the open fishing vessel is the ability to walk around a centrally located console station. Most open fishing vessels include the use of a T-top that, as the name implies, is formed from a "T" like structure to provide shade and rain protection for those standing around the console. The T-top does not inhibit operation of the vessel, and allows an occupant to walk around the vessel uninhibited.

Fishing with outriggers is performed when a fishing vessel is driven slowly, commonly referred to as trolling, which permits the strategic placement of bait behind the vessel. Trolling allows the fishing vessel to cover large areas of water so as to increase the chance of catching fish. The quantity and spacing of the bait placed behind the vessel is generally proportional to the size of the vessel, as well as the success of the fishing expedition. If the bait is properly placed, the wake generated by the vessel can be made to appear like a school of fish. Bait that appears to be struggling or separated is most attractive to predator fish.

The use of outriggers provides a means for effectively widening the spacing of the bait, as well as adding additional bait/lines without fear of tangling the lines. An outrigger is basically a long pole having a proximal end coupled to the vessel and a distal end that can be rotated from a stowage position outboard to a trolling position. A positioning line is drawn along the length of the outrigger pole, wherein release clips secured to the positioning line are used to secure the fishing pole line at a desired location. When a fish strikes the bait, the release clip disengages the fishing line from the positioning line, and the fisherman is free to reel in the fish without interference. Proper placement of the outrigger pole and fishing line increases the chances of fish being drawn to the bait.

Mounting outriggers to open fishing vessels presents numerous problems, mainly due to the stability of a narrow beam boat in open water, as well as the operational speeds that the open fishing vessels are capable of. A basic requirement is the safety of the vessel occupants, wherein an operator of the outrigger can be rotated while the occupant remains in the safety of the vessel, preferably while standing next to the console, beneath the T-top. Associated with this safety aspect is the need for a locking mechanism capable of withstanding the large cantilever forces presented by the outrigger arrangement. For instance, a fifteen foot outrigger secured to a T-top has cantilever effect that places a very large bending moment at the base of the outrigger and outrigger positioner. When the vessel is operating in an ocean environment, it is not uncommon for the vessel to be subjected to large seas, wherein the twisting force of the outrigger pole places an enormous strain on the base of the outrigger. If the outrigger's sole source of outrigger pole positioning is the locking mechanism, the locking mechanism must be able to withstand the entire force presented by the cantilevered configuration.

All known prior art outrigger systems employ a rotating mechanism that is rotated by a handle or crank positioned beneath the T-top. Even with improvement to the handle or hand crank designs, the operator of the vessel must use a free hand to operate the device. This can pose a safety problem, if the boat is rocking, since the operator would have to raise an arm to operator the outrigger.

The Applicant has developed numerous outrigger devices to improve the viability of fishing boats, and improve the safety for the boat occupants that operate the outrigger devices. For instance, U.S. Pat. No. 4,993,346 presented an outrigger device for a T-Top equipped boat that permits the outrigger to be moved from a stowage position to a trolling position, and visa versa, by an occupant of the boat standing in the shelter of the T-Top.

U.S. Pat. No. 5,738,035 discloses a locking device for outrigger devices that are installed on a T-top equipped motorboat that has an outrigger pole supported by its inboard end above the T-top, and which permits the outrigger pole to be rotated from a stowage position to a trolling position using a cylindrical collar fixed to the tubular member having an indexing ring with a plurality of side opening cavities. A compression feature on the indexing ring is used to selectively permit such ring's rotation on the collar, and a locking lever holds the outrigger in place.

U.S. Pat. No. 5,778,817 discloses a locking device for outrigger devices that are installed on a T-top equipped motorboat that has an outrigger pole supported by its inboard end above the T-top, and which permits the outrigger pole to be rotated from a stowage position to a trolling position using a locking collar fixed to the bottom end of the tubular member and having a quadrant long horizontal slot in its middle portion recognized by sport fishermen, creating a ready market for the patented outrigger systems.

U.S. Pat. No. 6,769,377 discloses a gear-train driven outrigger device for use on a fishing vessel having an outrigger pole, which is rotatably journaled to a second tubular member mounted to a T-top. The second tubular member houses a gear-train driver assembly that allows manual or motor driven rotation of the outrigger pole. The gear-train driver assembly is constructed and arranged to provide infinite adjustment of the outrigger pole upon rotation of the first tubular member. The rotation of the first tubular member allows for movement of the outrigger pole from a stowage position to a trolling position and vice versa.

Accordingly, what is lacking in the art is an outrigger positioner that provides controlled rotation of an outrigger pole in both a horizontal and vertical position by use of an electric motor.

SUMMARY OF THE INVENTION

An electric outrigger positioner having a top assembly including a main arm pivotally attached to a base assembly configured for receipt of an outrigger pole. A worm gear assembly located in the pivot arm is coupled to a motor, causing the main arm to elevate from, a horizontal position to an elevated position. A second motor is coupled to a worm gear assembly in the base assembly which is attached to the base of the top assembly. The second motor rotates the top assembly from a position parallel to a centerline of the boat to a desired position off the beam of the vessel.

An objective of the invention is to provide an outrigger positioner that positions an outrigger pole in a deployed or stowage position by use of an electrical drive system.

A further objective of the invention to provide and outrigger positioner for adjusting the elevation of the outrigger for deployment with an electric drive system.

Yet another objective of this invention is to provide an outrigger positioner with an arm that rotates about the base with an electric drive system.

A further objective of this invention is to provide an outrigger positioner that can be simultaneously rotated and elevated into the desired fishing location.

Another objective of the invention is to increase the occupant safety on a vessel by eliminating the need for manual deployment and stowage of outriggers.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE DRAWINGS

FIG. 4 is a top perspective view of the outrigger positioner top assembly;

FIG. 5 is a partial cross-sectional view taken along lines B-B of FIG. 4;

FIG. 6 is an exploded view of the top assembly;

DETAILED DESCRIPTION OF THE PREFERRED EMBODIMENT

A detailed embodiment of the instant invention is disclosed herein; however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
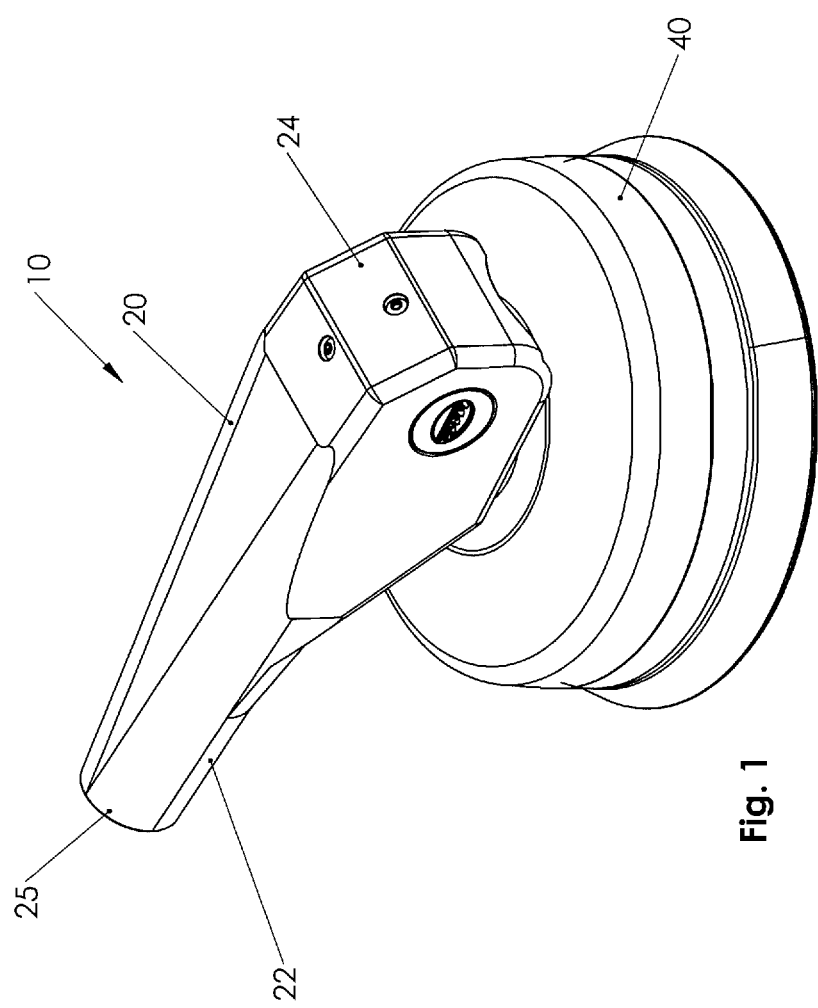
FIG. 1 is a perspective view of the outrigger positioner in a stowage position.
Figure 2:
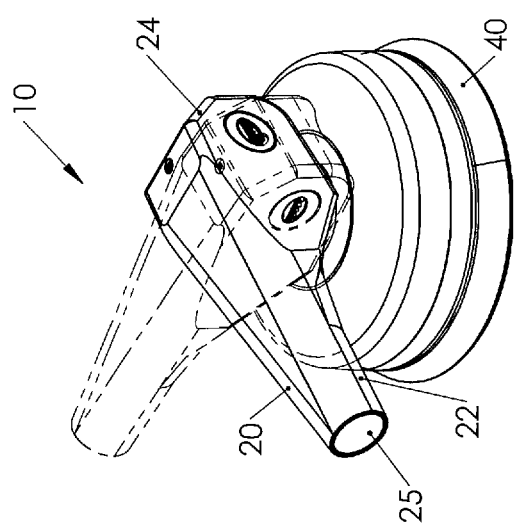
FIG. 2 is a perspective view of the outrigger positioner with the arm deployed in a raised position.
Figure 3:
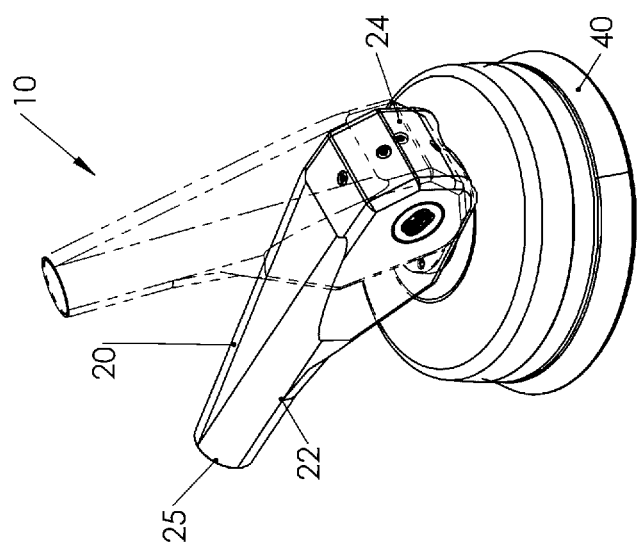
FIG. 3 is a perspective view of the outrigger positioner with the arm in a rotated position.
Figure 7:
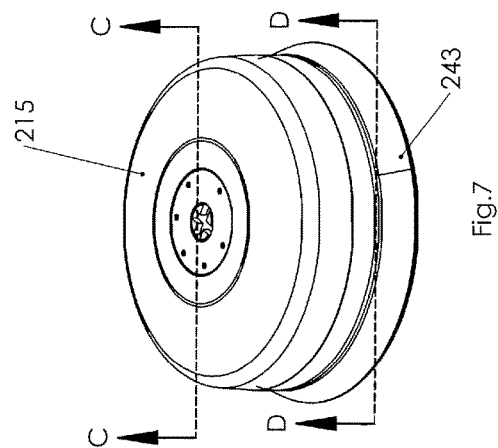
FIG. 7 is a perspective view of the base assembly of the outrigger positioner.
Figure 9:
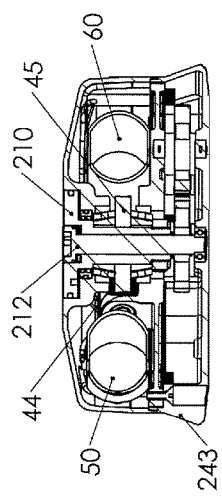
FIG. 9 is a partial cross-sectional view taken along lines C-C of FIG. 7.
Figure 10:
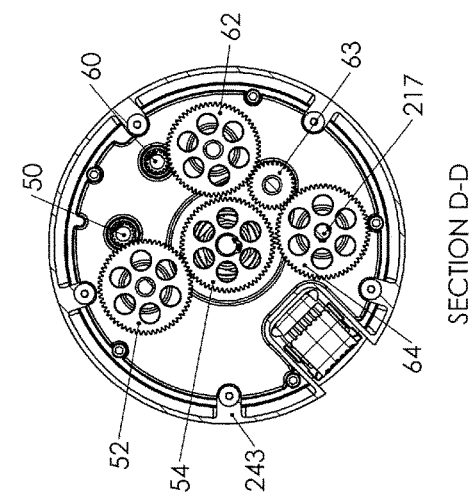
FIG. 10 is a cross-sectional view taken along lines D-D of FIG. 7.
Figure 8:
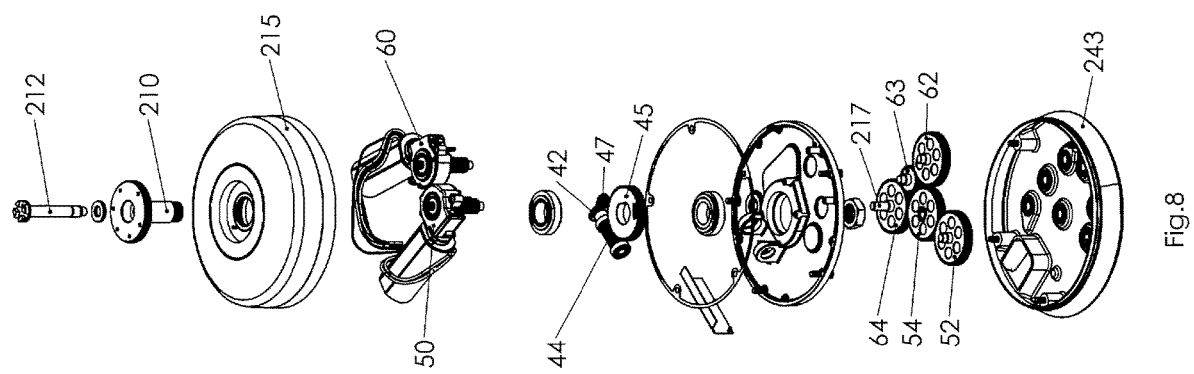
FIG. 8 is an exploded view of the base assembly of the outrigger positioner.

Referring to FIGS. 1-3, disclosed is an outrigger positioner comprised of a top assembly 20 and a base assembly 40. The top assembly having an arm 22 with a proximal end 24 and a distal end 25. The distal end 25 is constructed and arranged to receive an outrigger pole. The proximal end 24 of the arm is pivotally coupled to a mounting assembly 27. The mounting assembly 27 is attached to base assembly 40.

FIG. 2 illustrates the top assembly 20 range of motion to raise the elevation of the arm 22 from a storage position to a deployed position. An operator has the option to adjust the elevation of the arm 22 to any desires position. FIG. 3 illustrates the rotational range of the top assembly 20 from the storage position to any desired position required by the angler. In a one embodiment, the top assembly 20 can be rotated and elevated simultaneously.

FIG. 4 is one embodiment of the top assembly 20. FIG. 5 is a partial cross-sectional view taken along lines B-B of FIG. 4. The top assembly 20 has at least one worm drive assembly comprised of a worm shaft gear 30 and a worm wheel gear 31 constructed and arranged for mechanically adjusting the elevation of the arm 22. The top assembly 20 includes a mounting assembly 27 that is fixed to base assembly 40 with fasteners 119. To seal the shaft from the elements a gasket 112 is installed.

As shown in FIGS. 5-6, worm wheel gear 31 is installed upon pin 97 and is engaged with worm shaft gear 30. Bolts 117 and 118 are constructed and arranged to fixedly engage worm wheel gear 31 to pin 97. Pin 97 is the axis about which the top assembly 20 rotates in order to change the elevation of arm to the desired height. At the base of worm shaft gear 30 is a shaft coupler 114 and a shaft key 116 constructed and arranged for connection to a motor. The outrigger positioner top assembly arm is designed to accommodate different length outrigger poles. Therefore, the top assembly arm 22 includes a releasable pin 115 for securing various outrigger poles.

FIGS. 7-10 are base assembly 40 having a top case 215 and a lower case 243. Within said base assembly 40 is at least one worm drive assembly 42 including a worm shaft gear 44 and a worm wheel gear 45 constructed and arranged for mechanically rotating the base assembly.

A first motor 50 drives a plurality of gears that engage said worm shaft gear 30 in said top assembly allowing adjustment of the elevation of said outrigger positioner to any desired position. In one exemplary embodiment, first motor 50 is constructed and arranged to offset drive gear 52, which drives center gear 54. Center gear 54 is connected to shaft 212 which is connected to shaft coupler 114. This configuration drives worm shaft gear 30 which changes the elevation of the top assemble 20. In one embodiment, it is contemplated that motor 50 will be configured to rotate both clockwise and counterclockwise in order to achieve the desired elevations.

A second motor 60 drives a plurality of gears that engage the worm shaft gear 44 in the base assembly 40 thereby allowing rotation of the outrigger positioner to any desired position. In one exemplary embodiment, second motor 60 rotates drive gear 62, which rotates intermediate gear 63, which further drives shaft mounted ear 64. Gear 64 is connected to shaft 217 which is connected to gear 47. Gear 47 drives worm shaft gear 44 which drives worm wheel gear 45. Worm wheel gear 45 is attached to shaft 210. Shaft 210 is fixedly attached to mounting assembly 27 which allows for rotation of the top assembly 20. In one non-limiting embodiment, it is contemplated that motor 60 will be configured to rotate both clockwise and counterclockwise in order to achieve the desired elevations.

In one embodiment, the top assembly arm worm wheel gear has a gear ratio of 60:1. Additionally the base assembly worm wheel gear has a gear ratio of 60:1. However, any suitable gear ratio configuration can be utilized in this application.

The outrigger positioner 40 is mounted to a boat T-top with the motors 50 and 60 electrically coupled to a power source. Alternatively, the motors 50 and 60 can also be powered by batteries. In one example, when power is supplied to the motors, the main arm 22 is raised from a horizontal position to a raised position, placing the outrigger at about a 60-degree angle relative to the horizon. Simultaneously, the top assembly 20 is rotated from a position that placed the outrigger parallel to the centerline of a vessel, to a position that places the outrigger at a position 90-degree to the centerline of the vessel. The motors 50 and 60 can either each be operated automatically by a switch on the console of the boat or by remote control device. The configuration of the outrigger positioner 40, allows the boat operator the option to place the outrigger poles from a stowage position to a deployed position, and a deployed position to a stowage position, while safely keeping both hands on the steering wheel.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An outrigger pole positioner comprising:
   a base assembly securable to a boat T-top;
   an arm having a distal end adapted to hold an outrigger pole and a proximate end attached to said base assembly by a pin member;
   a first worm drive assembly consisting of a vertically disposed wheel gear attached to said pin member for engaging said arm, said wheel gear rotatably coupled to a first worm shaft gear coupled to a shaft mounted center gear, said shaft mounted center gear rotatable by an offset gear;
   a first motor coupled to said first offset gear for rotation of said center gear, rotation of said first motor in a clockwise or counter-clockwise direction rotates said vertically disposed wheel gear to pivot said arm around said pin member for adjusting vertical elevation of the distal end of said arm and outrigger pole;
   a second worm drive assembly consisting of a worm shaft gear coupled to a horizontally disposed wheel gear rotatable by a shaft mounted gear, said shaft mounted gear rotatable by a drive gear connected to an intermediate gear;
   a second motor positioned adjacent to said first motor, said second motor coupled to said drive gear, rotation of said second motor in a clockwise or counter-clockwise direction rotates said horizontally disposed wheel gear for adjusting horizontal placement of said arm and outrigger pole.

2. An outrigger positioner according to claim 1, wherein said arm includes a releasable pin for securing an outrigger pole.

3. An outrigger positioner according to claim 1, wherein said first worm drive assembly includes a gear ratio of 60:1.

4. An outrigger positioner according to claim 1, wherein said second worm drive assembly includes a gear ratio of 60:1.

5. An outrigger positioner according to claim 1, wherein said first motor and said second motor are electrically coupled to the onboard electrical system.

6. An outrigger positioner according to claim 1, wherein said first motor and said second motor are powered by batteries.

7. An outrigger positioner according to claim 1, wherein said first motor and said second motor are operated with a remote control.

* * * * *